US008667225B2

(12) United States Patent
Sander et al.

(10) Patent No.: US 8,667,225 B2
(45) Date of Patent: Mar. 4, 2014

(54) STORE AWARE PREFETCHING FOR A DATASTREAM

(75) Inventors: Benjamin T. Sander, Austin, TX (US); Bharath Narasimha Swamy, Bangalore (IN); Swamy Punyamurtula, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 700 days.

(21) Appl. No.: 12/558,465

(22) Filed: Sep. 11, 2009

(65) Prior Publication Data

US 2011/0066811 A1    Mar. 17, 2011

(51) Int. Cl.
*G06F 12/00* (2006.01)

(52) U.S. Cl.
USPC ................................. 711/137; 711/E12.004

(58) Field of Classification Search
USPC .......................................... 711/137, E12.004
See application file for complete search history.

(56) References Cited

U.S. PATENT DOCUMENTS

| 5,778,436 | A |   | 7/1998 | Kedem et al. |
|---|---|---|---|---|
| 5,848,254 | A | * | 12/1998 | Hagersten ..................... 712/207 |
| 6,282,614 | B1 |   | 8/2001 | Musoll |
| 6,401,193 | B1 |   | 6/2002 | Afsar et al. |
| 6,457,101 | B1 |   | 9/2002 | Bauman et al. |
| 6,571,318 | B1 |   | 5/2003 | Sander |
| 6,865,652 | B1 |   | 3/2005 | Pencis et al. |
| 7,003,633 | B2 |   | 2/2006 | Glasco |
| 7,103,725 | B2 |   | 9/2006 | Glasco |
| 7,107,408 | B2 |   | 9/2006 | Glasco |
| 7,380,066 | B2 |   | 5/2008 | Griswell, Jr. et al. |
| 7,434,004 | B1 |   | 10/2008 | Spracklen et al. |
| 7,487,296 | B1 |   | 2/2009 | Iacobovici et al. |
| 7,836,259 | B1 |   | 11/2010 | Filippo et al. |
| 2006/0179239 | A1 | * | 8/2006 | Fluhr et al. ..................... 711/137 |
| 2010/0030973 | A1 | * | 2/2010 | Speight et al. ................ 711/137 |

FOREIGN PATENT DOCUMENTS

| EP | 0818733 | 1/1998 |
|---|---|---|
| WO | 2009/054959 | 4/2009 |

OTHER PUBLICATIONS

International Search Report in application No. PCT/US2010/048241 mailed Dec. 28, 2010.
U.S. Appl. No. 11/877,311, filed Oct. 23, 2007.
Office Action from European Patent Application No. 10755043.6 mailed Jun. 26, 2013, pp. 1-4.

* cited by examiner

*Primary Examiner* — Larry MacKall
(74) *Attorney, Agent, or Firm* — Rory D. Rankin; Meyertons, Hood, Kivlin, Kowert & Goetzel, P.C.

(57) ABSTRACT

A system and method for efficient data prefetching. A data stream stored in lower-level memory comprises a contiguous block of data used in a computer program. A prefetch unit in a processor detects a data stream by identifying a sequence of storage accesses referencing a contiguous blocks of data in a monotonically increasing or decreasing manner. After a predetermined training period for a given data stream, the prefetch unit prefetches a portion of the given data stream from memory without write permission, in response to an access that does not request write permission. Also, after the training period, the prefetch unit prefetches a portion of the given data stream from lower-level memory with write permission, in response to determining there has been a prior access to the given data stream that requests write permission subsequent to a number of cache misses reaching a predetermined threshold.

20 Claims, 9 Drawing Sheets

Table 350

| Demand Request Address | Access Type | Data Stream State | Sticky Store (Y/N) | Prefetch (Y/N) | Write Permission (Y/N) | Delta | Speculative Addresses |
|---|---|---|---|---|---|---|---|
| X-2 | NA | Allocate | N | N | NA | NA | NA |
| X-1 | NA | Train | N | N | NA | NA | NA |
| X | Load | Prop | N | Y | N | 1 | X+1 to X+4 |
| X+1 | Load | Prop | N | Y | N | 4 | X+5 to X+8 |
| X+1 | Load | Prop | N | N | NA | NA | NA |
| X+2 | Store | Prop | Y | Y | Y | 1 | X+3 to X+6 |
| X+3 | Load | Prop | Y | Y | Y | 4 | X+7 to X+10 |
| X+3 | Load | Prop | Y | N | NA | NA | NA |
| X+3 | Store | Prop | Y | N | NA | NA | NA |
| X+4 | Load | Prop | Y | Y | Y | 7 | X+11 to X+14 |

FIG. 4

STORE AWARE PREFETCHING FOR A DATASTREAM

BACKGROUND OF THE INVENTION

1. Field of the Invention

This invention relates to computing systems, and more particularly, to efficient cache line prefetching.

2. Description of the Relevant Art

Modern microprocessors may include one or more processor cores, or processors, wherein each processor is capable of executing instructions of a software application. These processors are typically pipelined, wherein the processors include one or more data processing stages connected in series with storage elements (e.g. registers and arrays) placed between the stages. Ideally, every clock cycle produces useful execution of an instruction for each stage of a pipeline. However, a stall in a pipeline may cause no useful work to be performed during that particular pipeline stage. One example of a stall, which typically is a multi-cycle stall, is a data-cache or an instruction-cache miss. There may be a substantial latency associated with retrieving data from higher level caches and/or system memory. This latency, which is the total number of processor cycles required to retrieve data from memory, has been growing rapidly as processor frequencies have increased faster than system memory access times.

In various embodiments, system memory may comprise two or more levels of cache hierarchy for a processor. Later levels in the hierarchy of the system memory may include access via a memory controller to dynamic random-access memory (DRAM), dual in-line memory modules (dimms), a hard disk, or otherwise. Access to these lower levels of memory may require a significant number of clock cycles. The multiple levels of caches that may be shared among multiple cores on a multi-core microprocessor help to alleviate this latency when there is a cache hit. However, as cache sizes increase and later levels of the cache hierarchy are placed farther away from the processor core(s), the latency to determine if a requested memory line exists in a cache also increases. Should a processor core have a memory request followed by a serial or parallel access of each level of cache where there is no hit, followed by a DRAM access, the overall latency to service the memory request may become significant.

One solution for reducing overall performance decline due to the above problem is overlapping a cache line fill transaction resulting from a cache miss with out-of-order execution of multiple instructions per clock cycle. However, a stall of several clock cycles still reduces the performance of the processor due to in-order retirement that may prevent complete overlap of the stall cycles with useful work. Another solution is to use a speculative prefetch request to lower level memory, such as DRAM, of a predetermined number of cache lines ahead of the data currently being processed. This prefetch request may be in series or in parallel with the current memory request to the cache subsystem of one or more levels. Therefore, after the current memory request the latency to access subsequent memory requests from the memory hierarchy may be greatly reduced. The data may already be residing in the cache, in the memory controller, or may shortly arrive in the memory controller due to the earlier speculative prefetch request.

A data stream prefetch unit has been used to detect data streams. A data stream may be defined as a sequence of memory accesses referencing contiguous blocks of data. The contiguous blocks of data may be stored in one or more levels of a memory hierarchy. For example, the blocks of data may be stored in main memory and may be read out and sent to one or more caches in higher levels of a memory hierarchy. The conveying of this contiguous block of data from lower levels to higher levels of a memory hierarchy may be due to a cache line fill transaction. Alternatively, the conveying of this contiguous block of data may be due to a prefetch transaction. In one example, a data stream may be used in the execution of an algorithm for sharpening images or pixels. Such an algorithm may use the following expression in a loop: a[i]=b[i]+c[i].

Detecting a data stream may include identifying a sequence of memory accesses referencing a contiguous set of cache lines in a monotonically increasing or decreasing manner. In response to detecting a data stream, a data stream prefetch unit may begin prefetching a predetermined number of cache lines ahead of the currently requested cache line. A data stream prefetch unit tracks a data stream with interspersed load and store accesses (henceforth called a mixed access data stream) and ignores the type of access (load or a store) of the miss address. As used herein, a store operation, or instruction, is a write access while a load operation, or instruction, is a read access. Therefore, the data stream prefetch unit prefetches all cache lines in a read-only state. This read-only state may, for example, be associated with a MOESI cache coherency protocol. A first store operation in the demand access stream from the processor that hits on a prefetched line is required to issue a state change request. The state change request acquires permission to write to the cache line. The state change request reduces the benefits of prefetching the cache line.

In view of the above, efficient methods and mechanisms for efficient cache line prefetching are desired.

SUMMARY OF EMBODIMENTS OF THE INVENTION

Systems and methods for efficient cache line prefetching in a processor. In one embodiment, a computing system comprises a cache, lower-level memory, load/store buffers on a processor core configured to convey non-speculative demand requests, and a prefetch unit on the processor core. In one example, a data stream may be used in the execution of an algorithm for sharpening images or pixels. Such an algorithm may use the following expression in a loop: a[i]=b[i]+c[i]. The prefetch unit stores characterization data corresponding to particular data streams.

Detecting a data stream may include identifying a sequence of storage accesses referencing a contiguous set of blocks of data in a monotonically increasing or decreasing manner. An initial corresponding miss address that is not contiguous with miss addresses of other existing data streams may be the start of a new data stream. Once the prefetch unit detects a new data stream, the prefetch unit may enter a predetermined training period.

Upon completion of the training period for a particular data stream, the prefetch unit may begin prefetching a portion of the given data stream from lower-level memory without write permission, in response to not detecting a first write access to the given data stream. Also, the prefetch unit may begin prefetching a separate portion of the given data stream from lower-level memory with write permission, in response to detecting a first write access to the given data stream after completion of the training period. Obtaining write permission at this time may avoid a subsequent state change penalty for a store operation detected on a subsequent prefetched cache line. Therefore, the benefit of prefetching the cache line with the subsequent store operation is still retained.

These and other embodiments will become apparent upon reference to the following description and accompanying drawings.

BRIEF DESCRIPTION OF THE DRAWINGS

FIG. 4 is a generalized block diagram of one embodiment of a table showing state and status transitions of a prefetch unit.

Figure 1:
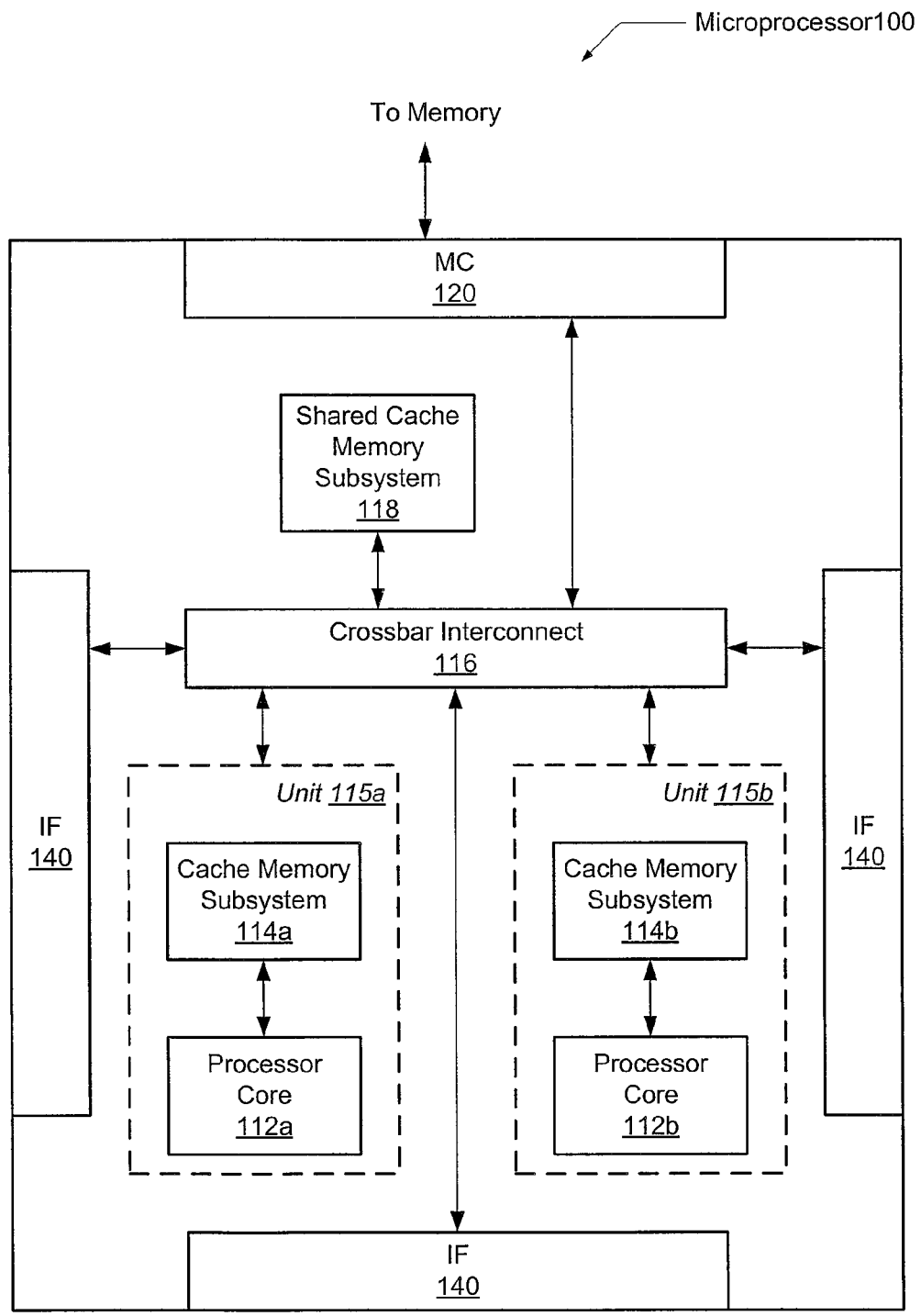
FIG. 1 is a generalized block diagram illustrating one embodiment of an exemplary microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1, one embodiment of an exemplary processor 100 is shown. Processor 100, which in the illustrated embodiment is a microprocessor, may include memory controller 120, interface logic 140, one or more processing units 115, which may include one or more processor cores 112 and corresponding cache memory subsystems 114; crossbar interconnect logic 116, and a shared cache memory subsystem 118. In one embodiment, the illustrated functionality of microprocessor 100 is incorporated upon a single integrated circuit.

Interface 140 generally provides an interface for input/output (I/O) devices off the microprocessor 100 to the shared cache memory subsystem 118 and processing units 115. As used herein, elements referred to by a reference numeral followed by a letter may be collectively referred to by the numeral alone. For example, processing units 115a-115b may be collectively referred to as processing units 115, or units 115. I/O devices may include peripheral network devices such as printers, keyboards, monitors, cameras, card readers, hard or floppy disk drives or drive controllers, network interface cards, video accelerators, audio cards, modems, a variety of data acquisition cards such as General Purpose Interface Bus (GPIB) or field bus interface cards, or other. Additionally, interface 140 may be used to communicate with other microprocessors and/or other processing nodes. Generally, interface logic 140 may comprise buffers for receiving packets from a corresponding link and for buffering packets to be transmitted upon the a corresponding link. Any suitable flow control mechanism may be used for transmitting packets to and from microprocessor 100.

Microprocessor 100 may be coupled to a respective memory via a respective memory controller 120. Memory may comprise any suitable memory devices. For example, a memory may comprise one or more RAMBUS dynamic random access memories (DRAMs), synchronous DRAMs (SDRAMs), DRAM, static RAM, etc. The address space of microprocessor 100 may be divided among multiple memories. Each microprocessor 100 or a respective processing node comprising microprocessor 100 may include a memory map used to determine which addresses are mapped to which memories, and hence to which microprocessor 100 or processing node a memory request for a particular address should be routed. In one embodiment, the coherency point for an address is the memory controller 120 coupled to the memory storing bytes corresponding to the address. Memory controllers 120 may comprise control circuitry for interfacing to memories. Additionally, memory controllers 120 may include request queues for queuing memory requests. In addition to the above, memory controllers 120 may include or be coupled to a prefetch unit.

Generally speaking, crossbar interconnect logic 116 is configured to respond to received control packets received on the links coupled to Interface 140, to generate control packets in response to processor cores 112 and/or cache memory subsystems 114, to generate probe commands and response packets in response to transactions selected by memory controller 120 for service, and to route packets for an intermediate node which comprises microprocessor to other nodes through interface logic 140. Interface logic 140 may include logic to receive packets and synchronize the packets to an internal clock used by crossbar interconnect 116. Crossbar interconnect 116 may be configured to convey memory requests from processor cores 112 to shared cache memory subsystem 118 or to memory controller 120 and the lower levels of the memory subsystem. Also, crossbar interconnect 116 may convey received memory lines and control signals from lower-level memory via memory controller 120 to processor cores 112 and caches memory subsystems 114 and 118. Interconnect bus implementations between crossbar interconnect 116, memory controller 120, interface 140, and processor units 115 may comprise any suitable technology.

Cache memory subsystems 114 and 118 may comprise high speed cache memories configured to store blocks of data. Cache memory subsystems 114 may be integrated within respective processor cores 112. Alternatively, cache memory subsystems 114 may be coupled to processor cores 112 in a backside cache configuration or an inline configuration, as desired. Still further, cache memory subsystems 114 may be implemented as a hierarchy of caches. Caches, which are nearer processor cores 112 (within the hierarchy), may be integrated into processor cores 112, if desired. In one embodiment, cache memory subsystems 114 each represent L2 cache structures, and shared cache subsystem 118 represents an L3 cache structure.

Both the cache memory subsystem 114 and the shared cache memory subsystem 118 may include a cache memory coupled to a corresponding cache controller. Processor cores 112 include circuitry for executing instructions according to a predefined general-purpose instruction set. For example, the x86 instruction set architecture may be selected. Alternatively, the Alpha, PowerPC, or any other general-purpose instruction set architecture may be selected. Generally, processor core 112 accesses the cache memory subsystems 114, respectively, for data and instructions. If the requested block is not found in cache memory subsystem 114 or in shared cache memory subsystem 118, then a read request may be generated and transmitted to the memory controller 120 en route to the location to which the missing block is mapped.

Figure 2:
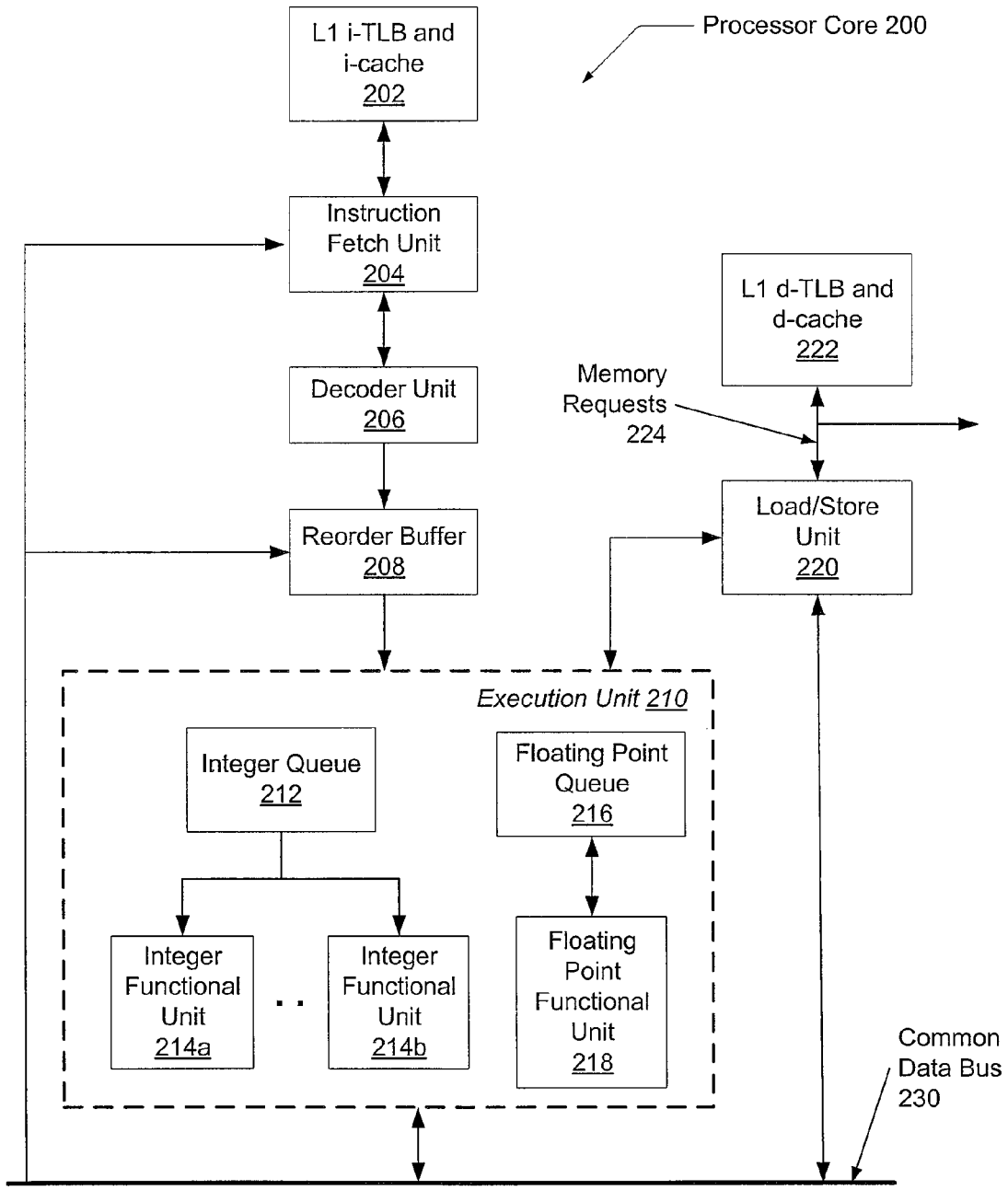
FIG. 2 is a generalized block diagram illustrating one embodiment of a general-purpose processor core that performs out-of-order execution.

FIG. 2 illustrates one embodiment of a general-purpose processor core 200 that performs out-of-order execution. An instruction-cache (i-cache) and corresponding translation-lookaside-buffer (TLB) 202 may store instructions for a software application and addresses in order to access the instructions. Both caches 202 and 222 may be located within processor core 200 or located outside such as in cache memory subsystem 114 of FIG. 1. The instruction fetch unit (IFU) 204 may fetch multiple instructions from the i-cache 202 per clock cycle if there are no i-cache misses. The IFU 204 may include a program counter that holds a pointer to an address of the next instructions to fetch in the i-cache 202, which may be compared to addresses in the i-TLB. The IFU 204 may also include a branch prediction unit to predict an outcome of a conditional instruction prior to an execution unit determining the actual outcome in a later pipeline stage.

The decoder unit 206 decodes the opcodes of the multiple fetched instructions and may allocate entries in an in-order retirement queue, such as reorder buffer 208. Entries may be allocated within integer queue 212 and floating-point queue 216 following the allocation within reorder buffer 208. Entries of an input queue within the load/store unit 220 may be allocated following the allocations within execution unit 210 or concurrently, if desired. The allocation of entries in the execution unit 210 and/or load/store unit 220 is considered dispatch. A discussion of the execution unit 210 will follow a description of memory accesses.

Memory accesses such as load and store operations are issued to the load/store unit 220. The load/store unit 220 may include queues and logic to execute a memory access instruction. Also, verification logic may reside in the load/store unit 220 to ensure a load instruction receives forwarded data from the correct youngest store instruction. The load/store unit 220 may send memory access requests 224 to the one or more levels of data cache (d-cache) 222 on the chip. Each level of cache may have its own TLB for address comparisons with the memory requests 224. Each level of cache 222 may be searched in a serial or parallel manner. If the requested memory line is not found in the caches 222, then a memory request 224 is sent to lower levels of cache memory such as caches 114 and 118, or possibly to off-chip memory. The serial or parallel searches, the possible requests to other memory, and the wait for the requested memory line to arrive may require a substantial number of clock cycles.

Results from the execution units 210 and the load/store unit 220 may be presented on a common data bus 230. The results may be sent to the reorder buffer 208. In one embodiment, the reorder buffer 208 may be a first-in first-out (FIFO) queue that ensures in-order retirement of instructions according to program order. Here, an instruction that receives its results is marked for retirement. If the instruction is head-of-the-queue, it may have its results sent to a corresponding architecture register file. Each of queues 212 and 216 may hold a corresponding architecture register file. The architecture register file may hold the architectural state of the general-purpose registers Is of processor core 200. Then the instruction in the reorder buffer may be retired in-order and its head-of-queue pointer may be adjusted to the subsequent instruction in program order.

The results on the common data bus 230 may be sent to execution unit 210 in order to forward values to operands of instructions waiting for the results. For example, an arithmetic instruction may have operands that depend on the results of a previous arithmetic instruction, or a load instruction may need an address calculated by an address generation unit (AGU) in the functional units 214. When these waiting instructions have values for their operands and hardware resources are available to execute the instructions, they may be issued out-of-order from the respective queues 212 and 216 to the appropriate resources in the functional units 214 and 216 or the load/store unit 220.

Uncommitted, or non-retired, memory access instructions have entries in the load/store unit 220. The forwarded data value for an in-flight, or uncommitted, load instruction from the youngest uncommitted older store instruction may be placed on the common data bus 230 or may be simply routed to the appropriate entry in a load buffer within the load/store unit 220.

Returning to execution unit 210, the queues 212 and 216 may store corresponding integer and floating-point instructions that wait for their operands to become available. Register renaming and execution scheduling may occur within queues 212 and 216 or within surrounding corresponding circuitry not shown. When operands are available and hardware resources are also available, an instruction may be issued out-of-order from the queues 212 and 216 to the integer functional units 214, the floating-point functional unit 218, and/or to the load/store unit 220. Each set of integer functional units 214 may include arithmetic logic units (ALU's) for integer computational calculations such as addition, subtraction, address-generation, determination of an outcome of a branch conditional instruction, multiplication, division, or otherwise. The floating-point functional unit 218 may include circuitry to perform floating-point addition, subtraction, multiplication, division, square root, integer to floating-point conversion, floating-point to integer conversion, or other.

In one embodiment, multiple integer functional units 214 may be instantiated in order to increase microprocessor instruction throughput. For example, processor core 200 may be configured to execute multiple software threads of execution. An operating system for microprocessor 100, and corresponding processor core 200, allocates regions of memory for a software application. When a software application is compiled, the application may comprise multiple processes. In such an embodiment, each process may own its own resources such as an image of memory, or an instance of instructions and data before application execution. Also, each process may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

Each process of the software application may be further split into software threads. Many modern microprocessors are configured to simultaneously execute two or more software threads. These microprocessors may have two or more hardware threads, or strands, available for parallel execution and assignment by the kernel of the operating system. For example, for a multi-threaded microprocessor, each integer functional unit 214 may receive one or more integer instructions of a particular thread per clock cycle depending on availability of hardware resources within a particular unit 214. The circuitry from instruction fetch unit 204 to integer queue 212 may be modified to manage the two or more strands of processor core 200 without duplicating the hardware of each unit. For example, registers holding architecture state of a thread may be duplicated, but execution hardware resources may not be duplicated.

In another embodiment, multi-threaded execution of processor core 200 may include instantiation of copies of an entire cluster, wherein a cluster is utilized for execution of a single thread and, in one embodiment, comprises the circuitry from decoder unit 206 to instruction functional unit 214. In such an embodiment, this circuitry may be referred to as an integer execution cluster. In another embodiment, a floating-point coprocessor may include the circuitry from decoder unit 206 to floating-point functional unit 218. There may be a less number of instantiations of this floating-point coprocessor than there are instantiations of an integer execution cluster. In such an embodiment, each floating-point coprocessor corresponds to two or more threads, whereas each integer execution cluster corresponds to a single different thread. Instruction fetch unit 204 would include circuitry to manage the multiple threads in core 200 and supply each cluster with one or more available corresponding instructions of a particular thread. In this case, each cluster is a strand, or hardware thread.

Although it may be desirable to instantiate multiple copies of floating-point unit 218 to accompany each copy of integer functional unit 214 from a circuit logic point-of-view, it may not be desirable from a hardware implementation point-of-view. For example, floating-point functional unit (FPU) 218 may contain complex logic that consumes a lot of on-die real estate. Also, floating-point operations are not performed often in program code. Therefore, a hardware designer may not be motivated to create independent expensive copies of floating-point functional unit 218 on the die.

Figure 3:
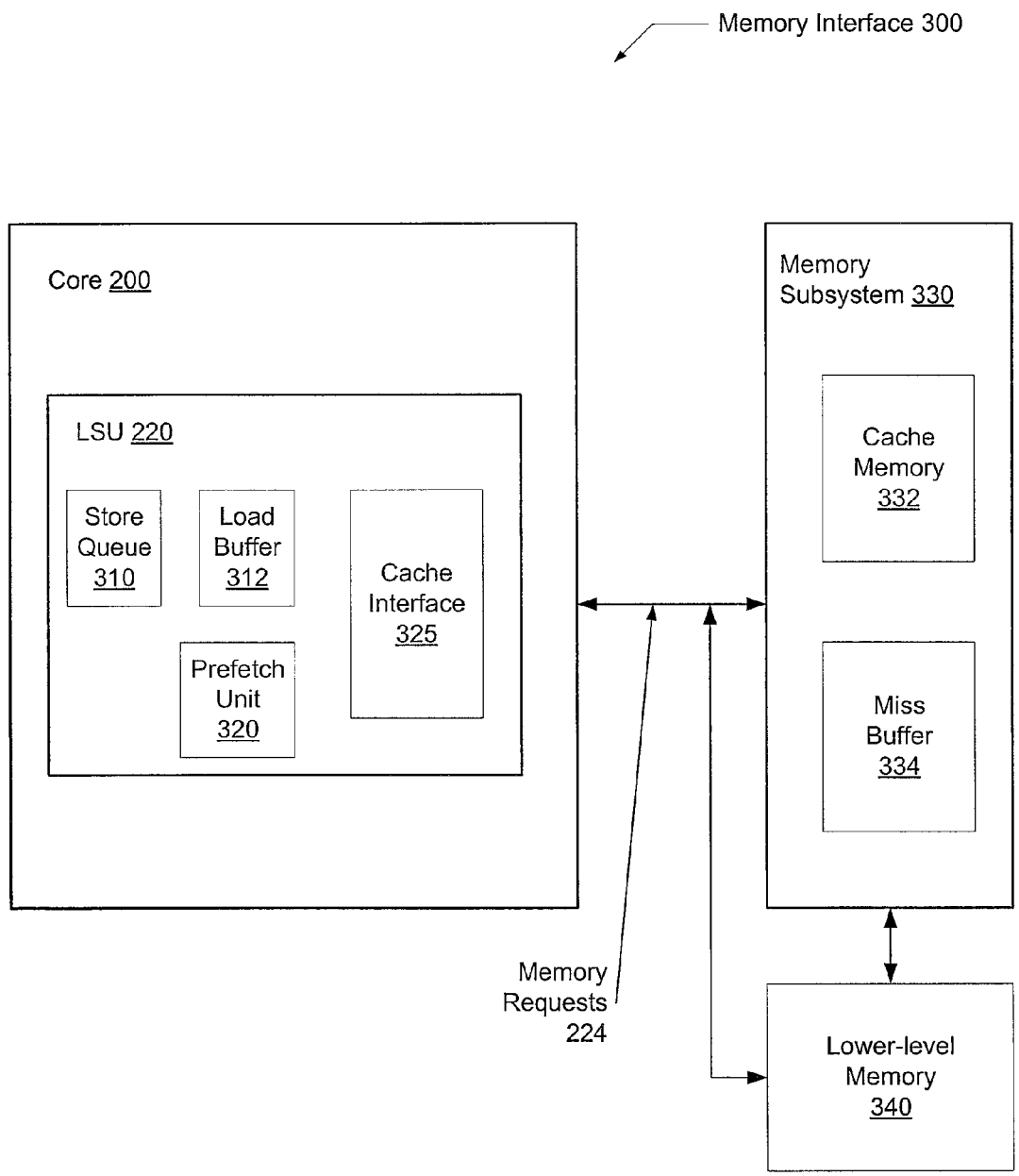
FIG. 3 is a generalized block diagram illustrating one embodiment of a memory interface illustrating different sources of memory requests.

Referring now to FIG. 3, one embodiment of a memory interface 300 illustrating different sources of memory requests is shown. It is noted the components shown in FIG. 3 illustrate a general organization and coupling of components, rather than an actual physical placement of the components. Circuitry and logic used in FIG. 2 and used in FIG. 3 are numbered accordingly. Examples of physical placements may be found in FIG. 1 and FIG. 2. In one embodiment, a memory subsystem 330 comprises a cache memory 332 that may correspond to an on-core L2 cache of a computing system with an accompanying miss buffer 334. In such an embodiment, the on-core L1 i-cache 202 and L1 d-cache 222 may have associated on-core miss buffers for holding addresses associated with memory reference instructions that have missed in the respective caches. In another embodiment, cache memory 332 may comprise multiple levels of a cache hierarchy such as L1 i-cache 202, L1 d-cache 222, an L2 d-cache, and an L3 d-cache with accompanying one or more miss buffers within miss buffer 334. Other combinations are possible and contemplated. Lower-level memory 340 may comprise main memory of the computing system. Both the cache memory 332 and the prefetch unit 320 may be coupled to lower-level memory 340. The prefetch unit 320 may send prefetch requests via memory subsystem 330 or independently form memory subsystem 330. The prefetch unit 320 may not be placed within miss buffer 334 in order to allow the prefetch unit 320 to detect both cache hits and cache misses. This detection may be useful in both a training state and a propagation state of the prefetch unit 320 as described in further detail below.

Cache memory 332 may contain all of the cache lines of a previous level. In one embodiment, in order to remove complexity from a L1 d-cache 222, the L1 d-cache may be implemented as a write-through cache and an L2 cache manages memory ordering and coherency issues. Therefore, memory requests within core 200 are sent to both the L1 d-cache 222 and a L2 cache, such as cache memory 332.

Cache memory 332 may service both non-speculative demand requests from store queue 310 and load buffer 312. In addition, cache memory 332 may service speculative prefetch requests from prefetch unit 320. A speculative prefetch request from prefetch unit 320 may be intended to bring data into cache memory 332 prior to when the data is actually needed, which may reduce a latency associated with memory accesses.

In one embodiment, the miss buffer 334 comprises a plurality of entries that queues all read and write operations, such as load, prefetch, and store instructions, which encounter conditions that prevent them from completing. For example, a requested cache line may not be present in cache memory 332. Alternatively, a requested cache line may be present in cache memory, but it does not have a particular cache coherency state. For example, a cache miss may occur for a store operation when a corresponding cache line in cache memory 332 is not in an exclusive state of a cache coherency protocol. A subsequent state change request may be sent, which includes additional latency to service the store operation. In one embodiment, cache memory 332 may be chosen to be a global ordering point for a memory model. In order to adhere to the rules of a memory model, there may need to be a global ordering point within the memory hierarchy. This global ordering point may include cache memory 332 that may be a L2 cache with an associated write-through L1 cache that serves as the reference for all store operations. Cache memory 332 may be responsible for ensuring that all consumers will see a consistent and proper ordering of store operations.

Memory requests may originate at least from the IFU 202, a store queue 310, and a load buffer 312. These memory requests may be referred to as demand memory requests. As described above, IFU 202 may be configured to select a thread to be fetched and to fetch instructions from i-cache 205 for the selected thread, which may correspond to an L1 cache with a corresponding L2 cache memory 332 in FIG. 3. Store queue 310 may be configured to convey memory requests to the same L1 and L2 caches for chosen threads in order to write-out data of committed store instructions for a chosen thread.

Load buffer 312 may be configured to convey memory requests to the same L1 and L2 caches for a chosen thread in order to read data of load instructions being executed. A data stream prefetch unit, or prefetch unit, 320 may be configured to convey speculative prefetch requests to the same L1 and L2 caches for a chosen thread in order to prefetch a predetermined number of cache lines ahead of the currently requested cache line. Prefetch unit 320 may be used to detect data streams. A data stream may be defined as a sequence of storage accesses referencing a contiguous set of cache lines in a monotonically increasing or decreasing manner. Therefore, in one embodiment, at least three sources within LSU 220 including store queue 310, load buffer 312, and prefetch unit 320, on the processor core 200 compete for access to an L2 cache memory 332 via a cache interface 325.

As stated earlier, cache memory 332 may service both non-speculative demand requests from store queue 310 and load buffer 312. In addition, cache memory 332 may service speculative prefetch requests from prefetch unit 320 subsequent to prefetch unit 320 detecting a data stream. The hit/miss status of each request serviced by memory subsystem 330 may be conveyed from memory subsystem 330 to LSU 220. The hit/miss status may be used, in one embodiment, to both detect a data stream and to determine when to initiate prefetch requests for the data stream. For example, the prefetch unit 320 may detect a miss address that is not contiguous with miss addresses of other existing data streams. This particular miss address may be the start of a new data stream. Once a predetermined number of miss addresses both contiguous to and adjacent to this particular address is reached, a training period may end and the prefetch unit may initiate data prefetch for this new data stream.

In one embodiment, while sending prefetch requests which do not request write permission, the prefetch unit 320 may be configured to detect a load or store access type of a non-speculative demand request. This demand request may be in a mixed access data stream interspersed with load and store accesses. By doing so, the prefetch unit 320 may be enabled to detect the first memory access operation following the end of the training period that requests write permission. In one embodiment, as a store operation may modify accessed data, a store operation is an example of an operation the requests write permission—either explicitly or implicitly. Other operations that may modify accessed data may similarly request write permission explicitly or implicitly. For example, a read/load-exclusive operation is an example of a load operation that either may modify the read data, or expressly intends to modify the read data. Therefore, certain read type operations may also request write permission—either explicitly or implicitly. Embodiments utilizing any desired combination of such operations that request write permission are contemplated. In various embodiments, prefetch requests following a detected operation that requests write permission may include obtaining write permission for the prefetched data, whereas prefetch requests prior to detecting such an operation may have prefetched the data without write permission. Utilizing such an approach, speculative prefetch requests following a previously detected operation that requests write permission may avoid a later state change penalty that results from a need to obtain write permission.

In one embodiment, the prefetch unit 320 may utilize a sticky store bit for each prefetch request in order to track whether a first store operation following the training period has been detected for a particular data stream. Once set, this sticky store bit may remain set even if the prefetch unit 320 subsequently detects load accesses for the same data stream. When a corresponding sticky store bit is set for an entry of a particular data stream within the prefetch unit 320, it may indicate a store operation was detected earlier in the set of non-speculative demand request addresses corresponding to the particular data stream. Following, the speculative prefetch requests sent corresponding to this particular data stream may request write permission of the requested cache lines.

Turning now to FIG. 4, one embodiment of a table 350 showing state and status transitions of a prefetch unit is shown. A generic cache line boundary address X and cache line boundary offsets are used to track addresses referencing a contiguous set of cache lines in a monotonically increasing manner. Whether an address corresponds to a load or a store access type is shown. In one embodiment, a particular data stream monitored in the prefetch unit 320 may have one of three states: allocate, train, and propagate.

A new data stream may be allocated within the prefetch unit 320 when a demand request address does not match addresses being tracked in existing data streams. Next, this newly allocated data stream enters a train state. In the train state, the data stream undergoes a training phase whereby subsequent demand request miss addresses are compared against a corresponding previous miss address and an expected next contiguous miss address. This data stream transitions from a train state to a propagate state when a predefined number of subsequent miss addresses are recognized to correspond to this data stream. In the propagate state, the prefetch unit 320 tracks subsequent accesses belonging to this same data stream, and may issue speculative prefetch requests in order to retrieve cache lines ahead of the currently referenced cache line. Further, if a corresponding sticky store bit is set, then the speculative prefetch requests being sent also obtain write permission of the prefetched cache lines. A sticky store bit, a prefetch state, and a write permission state are all shown in table 350.

A delta field within table 350 may determine an offset used for prefetching addresses relative to a current demand request address. In the example shown, an address X−2 may be recognized by the prefetch unit 320 to not belong to any existing data stream being tracked. Therefore a new data stream is allocated. In the example shown, each demand request address corresponds to a cache miss to simplify the example.

In the example shown, a predetermined number of 3 missed addresses is used to qualify a transition from a train state to a propagate state. The 3 missed addresses in this example include X−2, X−1, and X. Another predetermined number and additional qualifications may be chosen based on simulations for this transition. Once in a propagate state, the prefetch unit 320 sends a prefetch request denoted by the Y in the Prefetch column without write permission.

Prefetch requests cause data from lower levels of memory to be fetched or retrieved into an L1 cache, an L2 cache, both, or other combination. The retrieving of this data is done preferably before the data is needed by LSU 220. The concept of prefetching recognizes that data accesses frequently exhibit spatial locality. A common manifestation of spatial locality is a data stream, in which data from a block of memory is accessed in a monotonically increasing (or decreasing) sequence such that contiguous cache lines are referenced by at least one instruction. When the prefetch unit 320 detects a data stream, it may be reasonable to predict that future references will be made to addresses in cache lines that are adjacent to the current cache line following the same direction. The prefetch unit 320 may cause a processor to retrieve one or more of these adjacent cache lines before a software application actually requires them. It is noted that in other embodiments, prefetch unit 320 may also be coupled to lower levels of a memory hierarchy. For example, training and propagation may be based on L2/L3 hits and misses. Numerous such alternatives are possible and are contemplated.

In one embodiment, a delta of 1 is calculated by the logic within the prefetch unit 320. This delta value may be used to find an offset between the first speculative prefetch address X+1 and the current demand request address X. In this example, a predetermined number of lines of 4 cache lines is used for the prefetch requests. Therefore, speculative addresses X+1 to X+4 are used. In another embodiment, a different predetermined number of cache lines may be chosen. Additionally, this value may be calculated to be a different value for each prefetch request.

The sticky store bit is set with an access corresponding to the address X+2. This sticky store bit remains set for later accesses for this data stream. Therefore, the corresponding prefetch requests obtain write permission.

Figure 5:
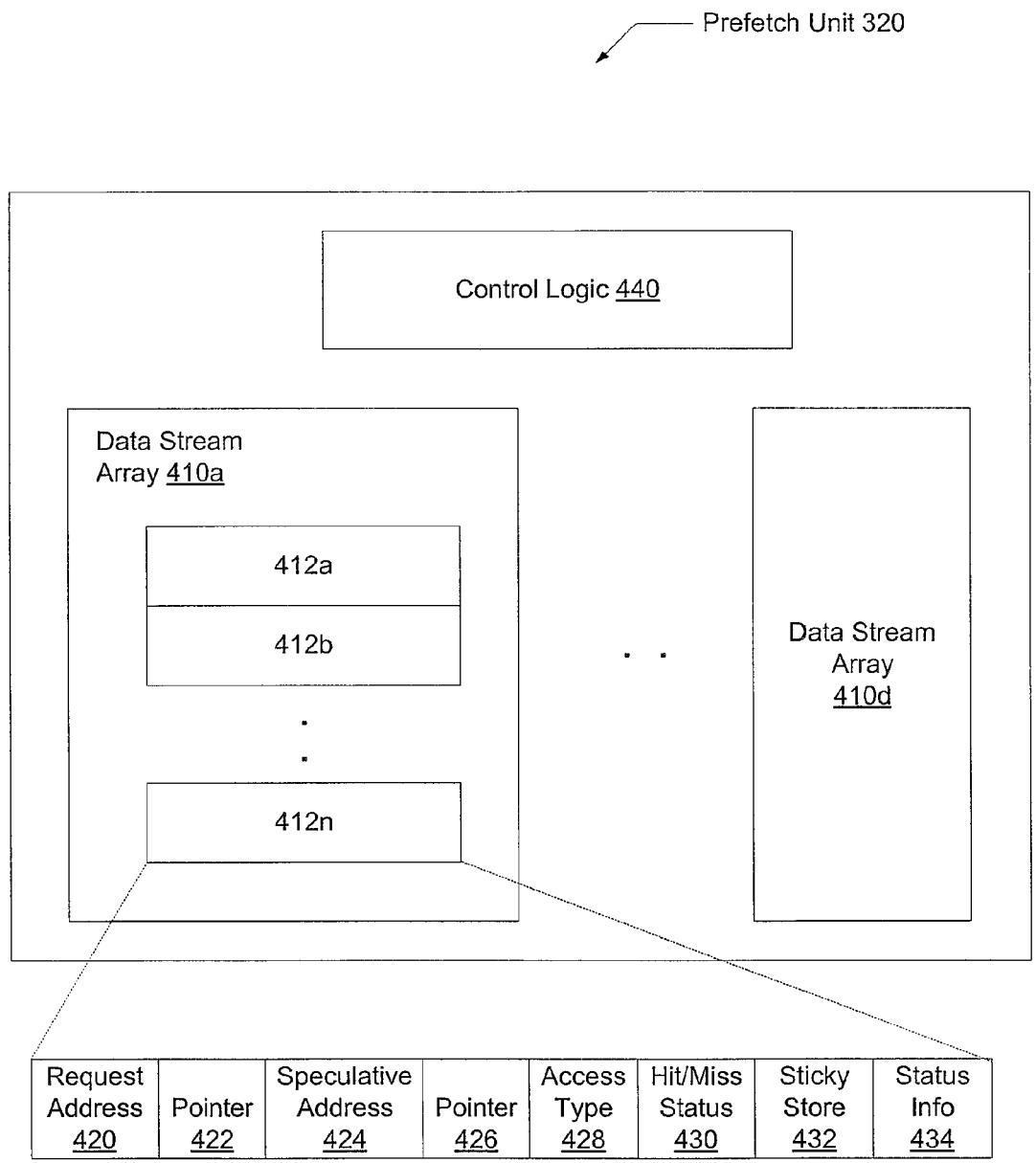
FIG. 5 is a generalized block diagram of storage of characterization data within the prefetch unit.

Turning now to FIG. 5, one embodiment of storage of characterization data within the prefetch unit 320 of FIG. 3 is shown. Prefetch unit 320 may include data stream arrays 410. In one embodiment, each entry 412 may be configured to queue characterization data of a data stream, such as addresses generated by LSU 220. In another embodiment, each entry 412 may not queue an address until the cache hit/miss status is sent to LSU 220. Request address field 420 may hold such an address. In one embodiment, only the portion of an address corresponding to a cache line boundary is queued. The bits corresponding to a byte offset may not be queued.

The characterization data may include the access type (load or store operation) of a demand request and may be queued in field 428. The cache hit/miss status corresponding to the generated address may be queued in field 430. A stick store bit value may be held in field 432. Alternatively, the sticky store bit and other status information, such as the data stream state (i.e. allocate, train, propagate), that is not entry-dependent may be queued in a register corresponding to a particular data stream array 410, rather than stored in each entry 412.

Control logic 440 may control the allocation of a new data stream. In one embodiment, control logic 440 may include circuitry and storage elements residing in a central location within the prefetch unit 320. In an alternative embodiment, each data stream array 410 may have its own corresponding control logic. In addition, control logic 440 may update status and address information of existing data streams. When an address is conveyed by LSU 220, or alternatively by miss buffer 334, a comparison may be performed between this address and request address field 420 and speculative address field 424 in each data stream array 410. When a match is found, control logic 440 may add another entry to the corresponding data stream array 410. The state (i.e. allocate, train, propagate) of the data stream may be stored in status information field 434 or a separate register. This state information may be updated by control logic 440.

In one embodiment, each demand request address and each speculative prefetch address may not be separately stored in fields 420 and 424 within a data stream array 410 due to on-chip real estate constraints. Rather, pointer fields 422 and 426 may be used to store a range of addresses. The speculative addresses corresponding to field 424 may be used to send prefetch requests to cache memory 332 of FIG. 3. In one embodiment, these prefetch requests are sent when a data stream has a propagate state.

If a generated address does not match a queued address or a derived address within a data stream array 410, then a new data stream may be created. In one embodiment, no match from the comparisons may be the only condition for creating a new data stream. In another embodiment, an additional condition may include the generated address may not be found in any entries of the miss buffer 334 with status information indicating a prefetch request has already been sent for this address. Other qualifying conditions are possible and contemplated.

If a new data stream is determined by control logic 440 to be created, then an assignment to a particular data stream array 410 is made. Control logic 440 may use any desired replacement algorithm, such as a least-recently-used (LRU) algorithm, to select an empty array 410 or to select an array 410 to be overwritten.

The status information field 434 may also include a stream identification value (SID), an up/down bit, a head of queue address, a length field, and a depth field. The length field and the head of queue address may define the boundaries of a data stream. When a data stream is first allocated, the head of queue field may contain the address of the first cache line in the data stream. The depth field may indicate the level of prefetching associated with the corresponding data stream (e.g., aggressive or conservative). This value may be used to derive the number of cache lines to request during a prefetch. The number of cache lines may vary or be a consistent number for each prefetch depending on a specific implementation.

Prefetching can be aggressive or conservative. The aggressiveness level may be reflected in the depth of a prefetch, or the number of cache lines prefetched by a request ahead of the cache line currently being loaded from or stored into by the computer program. Ideally, the depth of a prefetch implementation is optimized so that a sufficient number of cache lines are being prefetched to avoid a cache miss latency penalty while, at the same time, not causing excessive prefetching. Excessive prefetching refers to prefetching more cache lines than are necessary given the current maximum data bandwidth available to the processor.

A determination by control logic 440 of the number of cache lines to prefetch may use the ratio of memory latency to bandwidth. A number of prefetch requests greater than this ratio outstanding to memory may allow the full bandwidth of the system to be utilized without any gaps caused by latency. Other factors may be used to determine the number of cache lines to prefetch such as the number of concurrent data streams. The optimum prefetch depth for one data stream may not be the same as the optimum depth for another data stream. Control logic 440 may offer dynamic support and data stream specific control over prefetch parameters such as the prefetch depth. It is noted that although the fields in FIG. 5 are shown in a particular order, other combinations are possible and additional fields may be utilized. The bits storing information for the fields 420-434 may or may not be contiguous. Similarly, the arrangement of data stream arrays 410 and control logic 440 may use other placements for better design trade-offs.

Figure 6:
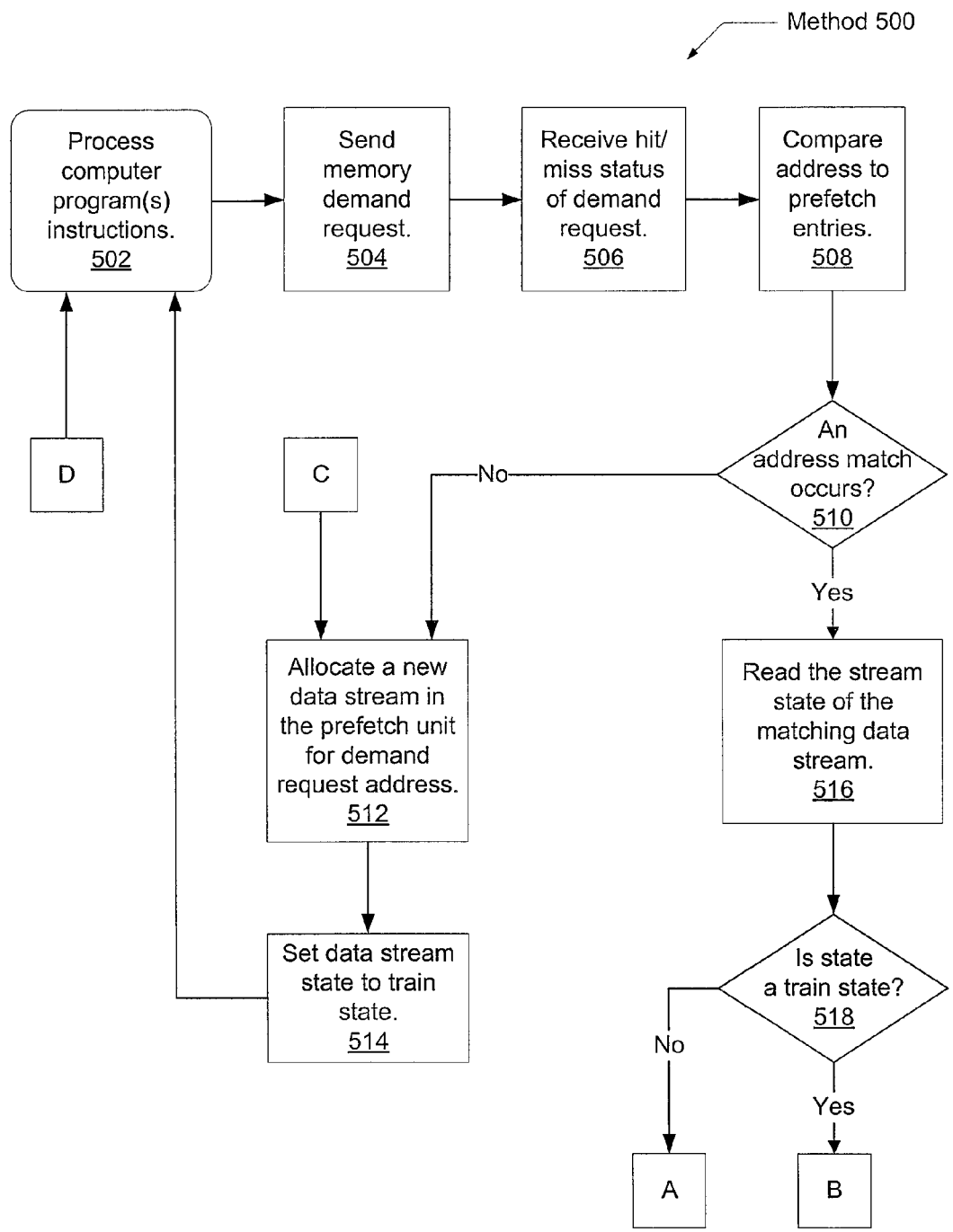
FIG. 6 is a flow diagram of one embodiment of a method for an efficient cache line prefetching in a processor.

Referring now to FIG. 6, one embodiment of a method 500 for efficient cache line prefetching in a processor is shown. Method 500 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, a processor core 200 may be executing instructions of one or more software applications in block 502. The core 200 fetches instructions of one or more software applications. These fetched instructions may be decoded and renamed. Renamed instructions are later picked for execution.

In block 504, memory reference instructions may send a demand request to memory. In one embodiment, the corresponding address may be conveyed to the prefetch unit 320. In another embodiment, the corresponding address may not be conveyed to the prefetch unit 320 until a cache hit/miss status is known in block 506. When the address is conveyed to the prefetch unit 320, in block 508, the address is compared to both stored demand request addresses and stored speculative addresses within the prefetch unit 320.

If an address match is not found (conditional block 510), then in block 512, a new data stream may be allocated in the prefetch unit 320. Additional qualifying conditions may be used before allocation occurs as described above. The data stream may have its state transition from allocate to train at this time in block 514. A next address may be derived with the aid of an up/down bit for a later comparison. Alternatively, two addresses may be derived, wherein one is a monotonic incremented value and the other is a monotonic decremented value, if the up/down value is not yet known. In another embodiment, a state transition from allocate to train may not occur until a later comparison is performed for the data stream with the derived values. Control flow of method 500 then returns to block 502.

If an address match is found (conditional block 510), then in block 516, the state of the data stream (i.e. allocate, train, propagate) is inspected. If the data stream is a newer data stream with either an allocate or a train state (conditional block 518), then control flow of method 500 moves to block B. Otherwise, control flow of method 500 moves to block A.

Figure 7:
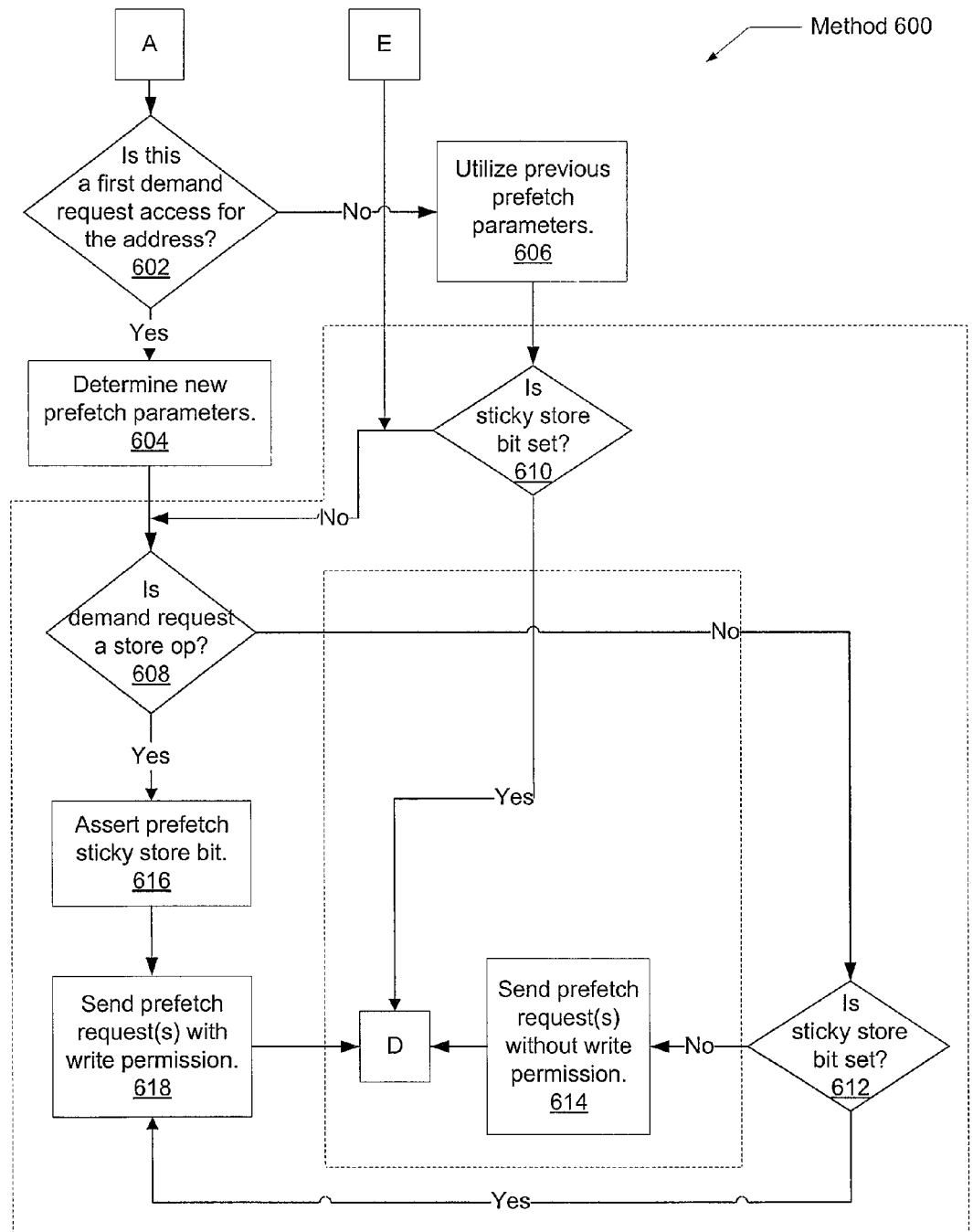
FIG. 7 is a flow diagram of one embodiment of a method for continuing efficient cache line prefetching in a processor.

Turning now to FIG. 7, one embodiment of a method 600 for continuing efficient cache line prefetching in a processor is shown. Similar to method 500, method 600 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, control flow of method 600 begins with block A, which is reached by an address match within a data stream that has a propagate state.

If the current access is a first demand request access for the corresponding address (conditional block 602), then a propagation hit occurs for the corresponding data stream. As used herein, a propagation hit refers to an address comparison match, or hit, within a data stream (e.g., a data stream identified by an array 410) that generates one or more prefetch requests based on the address. For example, an address match on a value stored in the speculative address field 424 (or on a value derived from field 424 and pointer field 426) in a particular data stream array 410 that has a state of "propagate" stored in the status field 434 may be a propagate hit. In block 604 new prefetch parameters may be determined. For example, a new delta value, such as the one shown in Table 350 of FIG. 4, may be calculated. If the prefetch depth, or the number of cache lines to be fetched, is not a constant value, then this value may be also calculated at this time. In one embodiment, control logic 440 may determine the conveyed demand request address is utilized in its first cache access by comparing the value to addresses stored in field 420 of each data stream array 410. An address utilized in its first cache access will not yet be stored in field 420. The address value may be stored in field 424 based on a prior prefetch, though.

If the access type of the conveyed demand request is a store operation (conditional block 608), then in block 616, a sticky store bit may be set. Once this sticky store bit is set, it will remain set. In block 618, one or more prefetch requests are sent with write permission using the derived prefetch parameters. The speculative addresses may be derived from the current matching demand request address, the delta value, and the prefetch depth value. Since the prefetch requests are sent with write permission, any later store operations that modify data in the retrieved cache lines will not experience a state change request penalty. Control flow of method 600 then moves to block D.

If the access type of the demand request is not a store operation (conditional block 608), then an inspection of the sticky store bit occurs. If the sticky store bit is set (conditional block 612), such as from a previous store access within the data stream and possibly earlier in the same cache line, then in block 618, one or more prefetch requests are sent with write permission using the derived prefetch parameters. Again, since the IS prefetch requests are sent with write permission, any later store operations that modify data in the retrieved cache lines will not experience a state change request penalty. Referring again to Table 350 of FIG. 4, the first occurrence of address X+3 and the occurrence of address X+4 fall into this category. Otherwise, if the sticky store bit is not set (conditional block 612), then in block 614, one or more prefetch requests are sent without write permission using the derived prefetch parameters. Control flow of method 600 then moves to block D.

If the current access is not a first demand request access for the corresponding address (conditional block 602), then a non-propagation hit occurs for the corresponding data stream. As used herein, a non-propagation hit refers to an address comparison match, or hit, within a data stream array (e.g., a data stream identified by array 410) that does not generate any prefetch requests based on the address. For example, an address match on a value stored in the demand request address field 420 of a particular data stream array 410 with a state of propagate stored in the status field 434 may be a non-propagate hit. Referring again to Table 350 of FIG. 4, the second occurrence of address X+1 and the second and third occurrences of address X+3 correspond to non-propagation hits. If the sticky store bit is set for this particular data stream (conditional block 610), then control flow of method 600 moves to block D. No prefetch requests are needed in this case, since an access is being done on data within a cache line already previously prefetched. Also, the sticky bit is already set, so no inspection of the access type of the demand request is needed. Otherwise, if the sticky store bit is not set (conditional block 610), then control flow of method 600 moves to conditional block 608. Here, the access type of the demand request is inspected.

Figure 8:
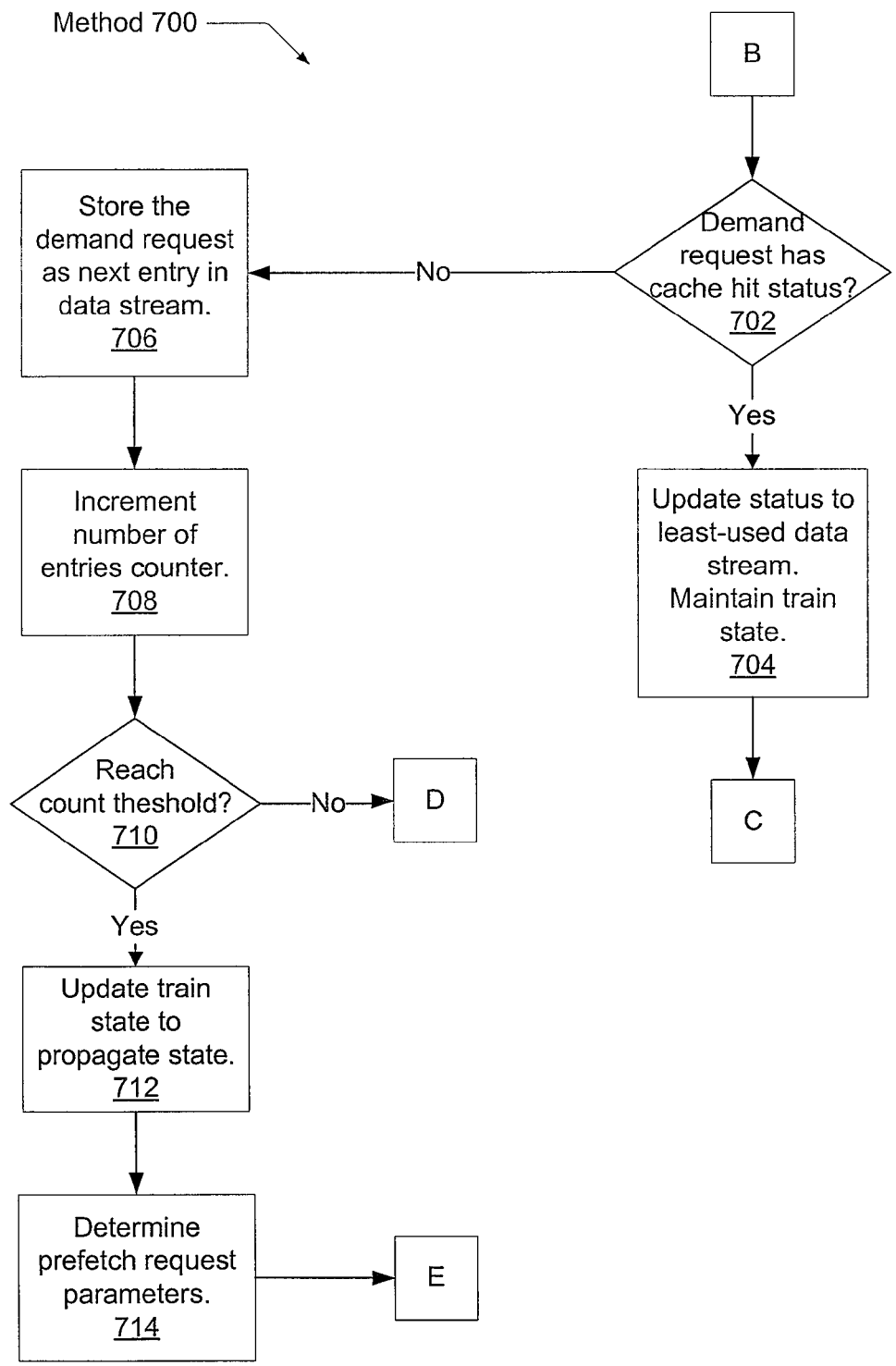
FIG. 8 is a flow diagram of one embodiment of a method for continuing efficient cache line prefetching in a processor.
Figure 9:
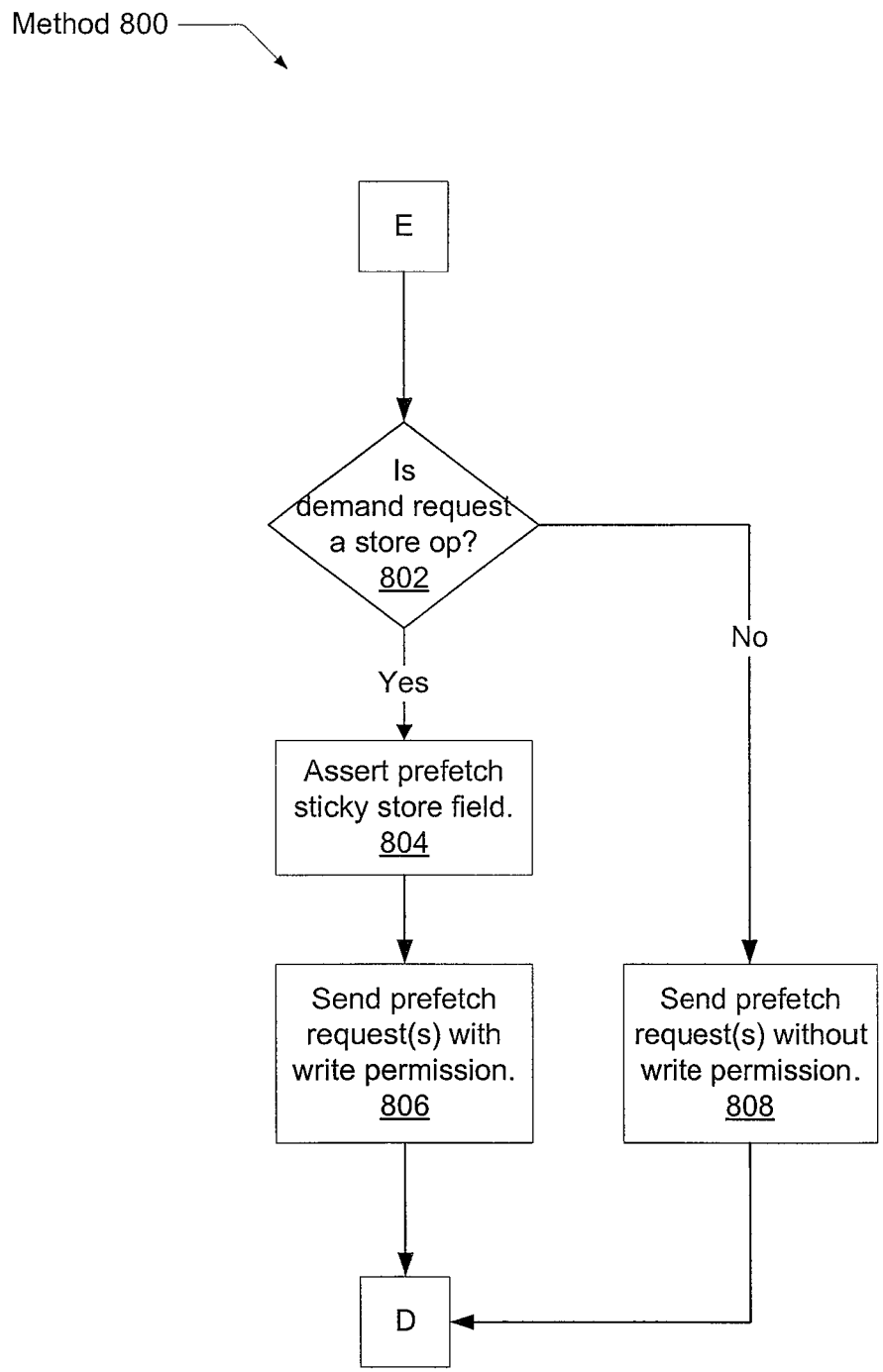
FIG. 9 is a flow diagram of one embodiment of a method for continuing efficient cache line prefetching in a processor.

Turning now to FIG. 8, one embodiment of a method 700 for continuing efficient cache line prefetching in a processor is shown. As with each method described, method 700 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, control flow of method 700 begins with block B, which is reached by an address match within a data stream that has a train state.

In one embodiment, if the demand request has a cache hit status (conditional block 702), then in block 704, the data stream with an address match may have its replacement strategy updated. For example, a value corresponding to a LRU algorithm may be updated to denote this data stream is a least-used data stream. In addition, the state of the data stream may remain at a train state, rather than transition to another state. Control flow of method 700 then moves to block C.

In one embodiment, if the demand request has a cache miss status (conditional block 702), then in block 706, the address may be stored as a next entry within the data stream corresponding to an address match. A number of entries counter may be incremented in block 708. This counter may maintain the number of entries that have been queued in this particular data stream. This count value may be used to determine when the data stream state should transition from the train state to the propagate state. In one embodiment, the access type of the conveyed demand request need not be inspected and control flow of method 700 may move from block 708 to conditional block 710. In another embodiment, this access type may be inspected and if the demand request is a store operation, a corresponding sticky bit may be set. In one embodiment, once this sticky bit is set, it remains set. Such an implementation may, for example, be used when it is believed a store operation occurring in a training state of the data stream safely predicts a store operation may occur in a later propagate state of the data stream.

If the number of entries counter reaches a predetermined threshold (conditional block 710), then the data stream state is updated. In block 712, this state transitions from the train state to the propagate state. In block 714, prefetch parameters may be determined. These parameters may include a delta value and a prefetch depth. Control flow of method 700 then moves to block E. If the number of entries counter does not reach a predetermined threshold (conditional block 710), then control flow of method 700 moves to block D.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. In addition, it is to be understood that the described computing system may be part of processor used in any suitable device, such as a desktop computer, laptop computer, server, handheld computing device, set-top box, router, or otherwise.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a cache; and
   a prefetch unit, wherein the prefetch unit is configured to:
      maintain a count of a number of cache misses for both read and write operations corresponding to a given data stream, wherein a data stream corresponds to a plurality of contiguous blocks of data in lower-level memory;
      detect an access to the given data stream;
      compare said count to a predetermined threshold;
      responsive to detecting said access and determining said count has reached the predetermined threshold:
         prefetch a portion of the given data stream from lower-level memory without write permission, responsive to there having not been an access to the given data stream that requests write permission subsequent to said number of cache misses reaching the predetermined threshold; and
         prefetch said portion of the given data stream from lower-level memory with write permission, responsive to there having been an access to the given data stream that requests write permission subsequent to said number of cache misses reaching the predetermined threshold.

2. The computing system as recited in claim 1, wherein said predetermined threshold is used to determine when the prefetch unit operates in a training state in which speculative prefetches are not performed, and a propagate state in which speculative prefetch requests are performed.

3. The computing system as recited in claim 1, wherein responsive to detecting said access and determining said count has reached a predetermined threshold, the prefetch unit is further configured to:
   prefetch said portion of the given data stream from lower-level memory with write permission, in response to determining said access requests write permission and said access caused said count to reach the predetermined threshold.

4. The computing system as recited in claim 1, wherein the prefetch unit is further configured to determine an integer delta value between an address of the access and an address of an initial prefetch cache line.

5. The computing system as recited in claim 1, wherein the prefetch unit is further configured to store characterization data corresponding to the one or more data streams.

6. The computing system as recited in claim 5, wherein said characterization data corresponding to a particular data stream comprises at least one of the following: a data stream identifier (ID), read/write access type of each demand request, an address of each demand request, a cache hit/miss status of a demand request, and an initial prefetch address corresponding to a demand request.

7. The computing system as recited in claim 5, wherein said characterization data is stored in a table, and wherein the prefetch unit is further configured to set a sticky store bit responsive to detecting a first access to the given data stream that requests write permission subsequent to said number of cache misses reaching the predetermined threshold, wherein once set the sticky store bit remains set while the given data stream data has a valid entry in the table.

8. The computing system as recited in claim 5, wherein said characterization data is stored in a table, and wherein the prefetch unit is further configured to allocate a new data stream in the table responsive to detecting a cache miss address of the new data stream is not adjacent to an address of a data stream currently stored in the table.

9. A method comprising:
   maintaining a count of a number of cache misses for both read and write operations corresponding to a given data stream, wherein a data stream corresponds to a plurality of contiguous blocks of data in lower-level memory;
   detecting an access to the given data stream;
   comparing said count to a predetermined threshold;
   responsive to detecting said access and determining said count has reached the predetermined threshold:
      prefetching a portion of the given data stream from lower-level memory without write permission, responsive to there having not been an access to the given data stream that requests write permission subsequent to said number of cache misses reaching the predetermined threshold; and
      prefetching said portion of the given data stream from lower-level memory with write permission, responsive to there having been an access to the given data stream that requests write permission subsequent to said number of cache misses reaching the predetermined threshold.

10. The method as recited in claim 9, wherein said predetermined threshold is used to determine when the prefetch unit operates in a training state in which speculative prefetches are not performed, and a propagate state in which speculative prefetch requests are performed.

11. The method as recited in claim 9, wherein responsive to detecting said access and determining said count has reached a predetermined threshold, the method further comprises:
   prefetching said portion of the given data stream from lower-level memory with write permission, in response to determining said access requests write permission and said access caused said count to reach the predetermined threshold.

12. The method as recited in claim 9, further comprising determining an integer delta value between an address of a current demand request and an address of an initial non-adjacent prefetch cache line.

13. The method as recited in claim 9, further comprising storing characterization data corresponding to the one or more data streams.

14. The method as recited in claim 13, wherein said characterization data corresponding to a particular data stream comprises at least one of the following: a data stream identifier (ID), read/write access type of each demand request, an address of each demand request, a cache hit/miss status of a demand request, and an initial prefetch address corresponding to a demand request.

15. The method as recited in claim 13, wherein said characterization data is stored in a table, and the method further comprises setting a sticky store bit responsive to detecting a first access to the given data stream that requests write permission subsequent to said number of cache misses reaching the predetermined threshold, wherein the sticky store bit once set remains set while the given data stream data is stored in an array.

16. The method as recited in claim 9, further comprising allocating a new data stream in storage responsive to detecting a corresponding cache miss address is not adjacent to addresses stored in existing data streams.

17. A prefetch unit comprising:
a first interface configured to be coupled to a cache;
a second interface configured to be coupled to lower-level memory;
control circuitry configured to maintain a count of a number of cache misses for both read and write operations corresponding to a given data stream, wherein a data stream corresponds to a plurality of contiguous blocks of data in lower-level memory;
wherein responsive to detecting an access to the given data stream comparing said count to a predetermined threshold, and determining said count has reached the predetermined threshold, the control circuitry is configured to:

prefetch a portion of the given data stream from lower-level memory without write permission, responsive to there having not been an access to the given data stream that requests write permission subsequent to said number of cache misses reaching the predetermined threshold; and prefetch said portion of the given data stream from lower-level memory with write permission, responsive to there having been an access to the given data stream that requests write permission subsequent to said number of cache misses reaching the predetermined threshold.

18. The prefetch unit as recited in claim 17, wherein said predetermined threshold is used to determine when the prefetch unit operates in a training state in which speculative prefetches are not performed, and a propagate state in which speculative prefetch requests are performed.

19. The prefetch unit as recited in claim 17, wherein responsive to detecting said access and determining said count has reached a predetermined threshold, the control circuitry is further configured to:

prefetch said portion of the given data stream from lower-level memory with write permission, in response to determining said access requests write permission and said access caused said count to reach the predetermined threshold.

20. The prefetch unit as recited in claim 17, further comprising a table comprising a plurality of entries, wherein each entry is configured to store characterization data corresponding to a particular data stream, and wherein said characterization data corresponding to a particular data stream comprises at least one of the following: a data stream identifier (ID), read/write access type of each demand request, an address of each demand request, a cache hit/miss status of a demand request, and an initial prefetch address corresponding to a demand request.

* * * * *